April 12, 1960 J. A. C. YULE 2,932,691

CIRCUIT FOR ALTERING INTELLIGENCE TO CARRIER SIGNAL RATIO

Filed June 14, 1955 2 Sheets-Sheet 1

INVENTOR
JOHN A. C. YULE
BY Campbell, Brumbaugh, Free and Graves
HIS ATTORNEYS

CIRCUIT FOR ALTERING INTELLIGENCE TO CARRIER SIGNAL RATIO

Filed June 14, 1955 2 Sheets-Sheet 2

INVENTOR
JOHN A. C. YULE
BY Campbell, Brumbaugh, Free and Graves
HIS ATTORNEYS 2,932,691

CIRCUIT FOR ALTERING INTELLIGENCE TO CARRIER SIGNAL RATIO

John A. C. Yule, Rochester, N.Y., assignor, by mesne assignments, to Time, Incorporated, New York, N.Y., a corporation of New York Application June 14, 1955, Serial No. 515,354

4 Claims. (Cl. 178—7.1)

This invention relates generally to methods and apparatus for a system which develops an electric signal facsimile of an original visual subject to the end of providing a printed or other permanently subsisting reproduction of the subject. More particularly the invention relates to methods and apparatus of the above-noted character which provide for modifying one or more of the facsimile signals in a manner which compensates for loss of detail in the reproduction because of a lesser range of intensity in the reproduction than in the original subject.

For a better understanding of the description to follow, reference is made to the accompanying drawings wherein.

Figure 1:
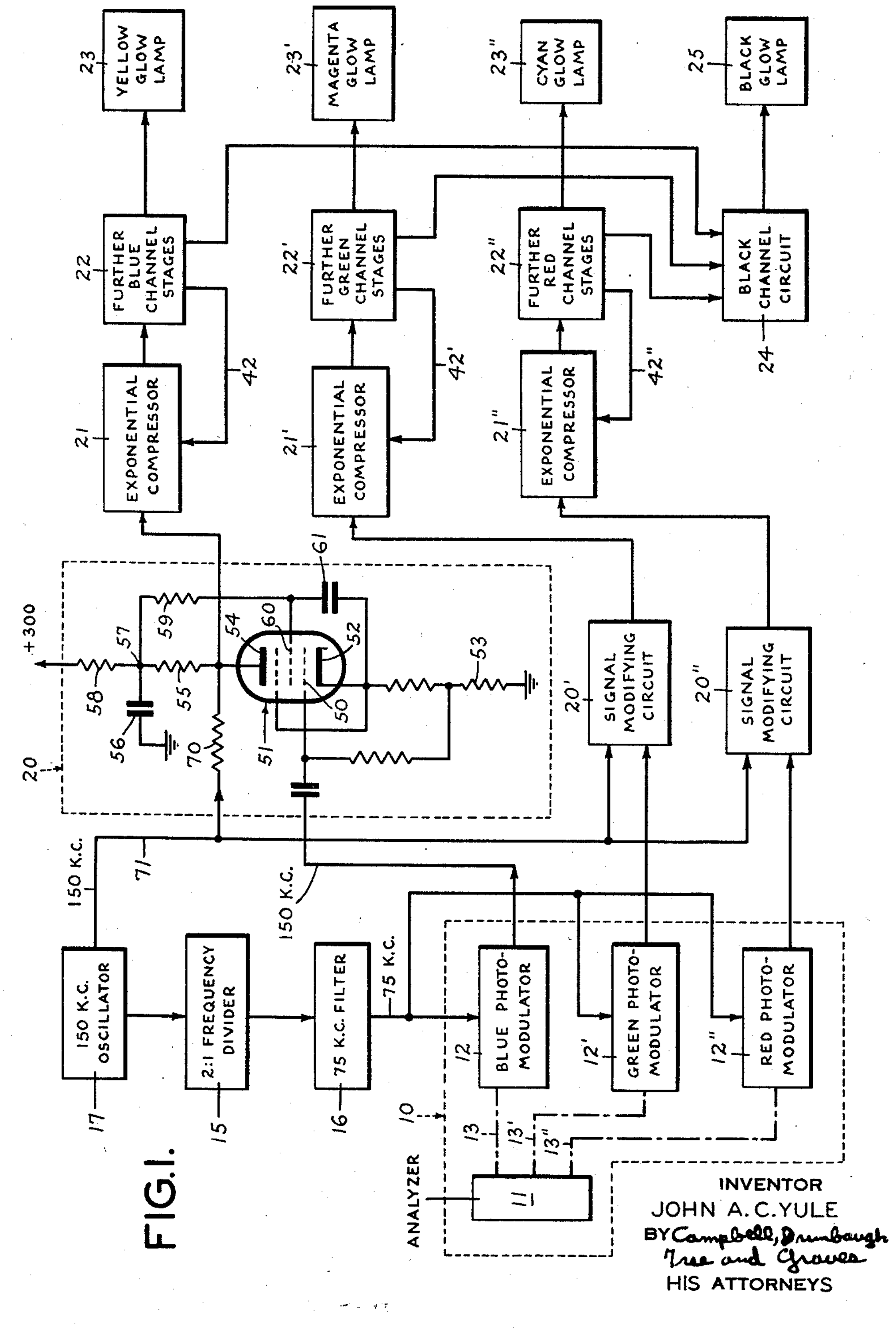
Fig. 1 is a schematic diagram, partly in block form and partly in detail form, of a facsimile reproduction system incorporating the present invention.

While the invention is of application in a black and white facsimile reproduction system, the invention was developed in connection with a color facsimile system, and, hence, will be described in connection with latter type of system.

The description which follows refers to like elements by utilizing a common reference number for the elements, and by further utilizing prime values to distinguish between like elements. It will be understood, accordingly, that, unless the context otherwise requires, the description concerning one element applies in like manner to other elements in the drawings having the same reference number.

In Fig. 1, the reference numeral 10 designates an electro-optical scanner comprised of a conventional optical color analyzer 11 and the blue, green and red photo-modulators 12, 12′ and 12″. The analyzer 11 is of a well-known type which scans successive elemental areas of a colored original subject (not shown), and which resolves the color of each scanned area into the three additive primary colors, blue, green and red. This resolution is effected by a splitting up of the light derived from a scanned area into three light beams 13, 13′ and 13″ whose respective intensity values are commensurate with the respective amounts of the three-mentioned additive color components which make up the color of the scanned area.

The blue light beam 13 is received by the photo-modulator 12 which may be similar to the type of photo-modulator disclosed in the British Patent 630,888 of 1949 to Jones. This type of photo-modulator comprises a photo-multiplier wherein, as is usual, the anode-cathode current of the photomultiplier develops a signal having amplitude fluctuations proportional to the intensity variations of the impinging light beam, but wherein a high frequency signal is injected onto one of the dynodes of the photo-multiplier. The operational conditions in the photomultiplier produce an output signal wherein the mentioned fluctuations representing light intensity have been converted into amplitude modulations on a high frequency carrier signal having twice the frequency of the injected signal.

In the present instance, the injection signal for the blue photo-modulator 12 is a 75 kc. signal derived by a conventional 2:1 frequency divider 15 and a 75 kc. filter 16 from the output of a 150 kc. oscillator 17. The output of blue photo-modulator 12 is, accordingly, a 150 kc. carrier signal having amplitude modulations which vary in proportion to the intensity values of the blue component in successively scanned elemental areas of the original subject.

It will be seen that the green photo-modulator 12′ and the red photo-modulator 12″ provide output signals of similar nature to the output signal of blue photo-modulator 12. These signals at the outputs of photo-modulators 12, 12′ and 12″ are referred to hereafter as the "scanner" signals.

The blue scanner signal is supplied to the input of a blue electric signal channel which may be, for the most part, similar to one of the color channels in a conventional color facsimile reproduction system, but which is represented herein in simplified form as being comprised of a signal modifying circuit 20, an exponential compression circuit 21, and a series of further blue channel stages represented by the block 22. The effect of the signal modifying circuit 20 and the exponential compressor 21 upon the scanner signal will be later described in detail.

After being operated on by circuits 20, 21, and after being rectified and otherwise considerably modified in the further blue channel stages 22, the blue color signal excites a "yellow" glow lamp 23 to emit light of an intensity which varies with the amplitude of the exciting signal. The color signals conveyed through the green and red channels respectively excite in like manner the "magenta" and "cyan" glow lamps 23′ and 23″. Also, as is conventional, the blue, green and red signals are fed to a blank channel 24 which responsively develops a signal which excites a "black" glow lamp 25.

The luminous emissions from the four glow lamps are formed into reproducing light beams (not shown) which scan in synchronism with the scanning action of the analyzer 11. Sheets having photosensitive emulsions thereon are respectively exposed to these reproducing light beams to give four separation negatives. From these negatives are produced corresponding half-tone printer plates which are thereafter respectively inked with yellow, magenta, cyan and black ink. The final color reproduction is obtained by transferring in superposition the four ink images on the half-tone plates onto an ink-receiving medium such as white paper.

The yellow, magenta and cyan ink colors are denoted "subtractive" primary colors herein by virtue of their association in this instance with printing inks which characteristically have a "subtractive" or light absorbing effect. The subtractive primary colors quantitatively bear a reciprocal relation to the additive primary colors. For example, yellow ink appears yellow by absorbing the blue component of impinging white light while reflecting the red and green components thereof, the last two components together being seen as the color yellow to the human eye. Hence, a large amount of blue in a color on the original is manifested as a low amount of yellow ink on the printed reproduction. Similar reciprocal relations exist between the amounts of green and red in the original and the respective amounts laid down of the magenta and cyan inks. In practice, the reciprocal relations just described are obtained in the course of conversion of a negative into a half-tone plate. While the density of a given area on the negative varies directly with the amplitude of the color signal which excites the glow lamp to expose the area. the amount of ink laid down in the corresponding area of the print varies inversely with the density of the negative in the given area.

It follows that the density on the print of any one of the four-mentioned inks bears a reciprocal relation to the amplitude of the signal which excites the glow lamp determining the deposition of that particular ink. In other words, a change in one sense of the amplitude of the exciting signals results in a change in the opposite sense of the density of the ink responsively laid down.

Because of inherent limitations in the spectral characteristics of the inks making up the half-tone print, the range of tone intensities on the original subject may be (and usually is) considerably greater than the range of tone intensities available in the print. For example, while the range of intensities of the original may be as much as 1–1500 in given intensity units, the reproduction may have an available range of intensities of no more than 1–50 in the same intensity units. This difference between the two intensity ranges makes it necessary, if the tonal details of the original are to be preserved, to provide for reduction of the full range of original tone intensities to the more limited range of tone intensities available in the reproduction.

To obtain this reduction in tone intensities, the described reproducing process incorporates a method step wherein the color signals are compressed according to the relation:

$$E_2=(E_1)^n \qquad (1)$$

where $E_1$, $E_2$ and $n$, respectively represent the amplitude of the scanner signal, the amplitude of the compressed signal, and the exponent of compression.

For a simplified explanation of why this relation achieves compression in the manner desired, reference is made to the well-known fact that the human eye responds logarithmically to light of varying intensity. Since the amplitude of the signal before compression can be considered, by a reasonable assumption, to be proportional to the intensity of an additive primary color characterizing the original, the response, $V_1$, of the human eye to these original intensities can be represented by the expression:

$$V_1=k_1 \log E_1=\log E_1 \qquad (2)$$

where $k_1$ is a constant, assumed (for the sake of simplicity) to have a value of 1. Also, since the intensity of the same additive primary color on the reproduced print can be considered, by a reasonable assumption, to be proportional to the amplitude of the signal after compression, the response $V_2$ of the human eye to the intensity of this reproduced additive primary color can be represented by the expression:

$$V_2=k_2 \log E_2=\log E_2 \qquad (3)$$

where $k_2$ is another constant, assumed (for the sake of simplicity) to also have a value of 1.

The right-hand terms of (2) and (3) can both be obtained by taking the logarithm of both sides of (1) to give the following relation:

$$\log E_2=\log (E_1)^n \qquad (4)$$

As is well known, (4) can be converted into the following expression:

$$\log E_2=n \log E_1 \qquad (5)$$

Substituting $V_1$ and $V_2$ from (2) and (3) for, respectively, the left-hand and right-hand terms of (5), there is obtained the expression:

$$V_2=nV_1 \qquad (6)$$

From (6) it is seen that if $n$ is less than 1, the brightness to the human eye of an additive primary color on the reproduction will be less than that of the parent color on the original, the relation in visual brightness of the two colors being in accordance with the value of, $n$, the exponent of compression. The conclusion follows that if, as set forth by (1), the color signals are compressed in accordance with an exponential function whereof the exponent, $n$, is of an appropriate value less than 1, the entire range of tonal intensities of the original can be reduced to fit into the more limited intensity range of the reproduction.

In furtherance of so reducing the tonal intensities, it has been the practice heretofore to give the color signals an exponential compression which is of the "linear" type in the sense that the exponent of compression, $n$ (while possibly adjustable from one value to another to provide different degrees of compression for an amplitude of given value for the signal), remains constant in value as the amplitude of the signal undergoing compression varies within the range of amplitudes which the signal may assume. A linear exponential compression of this sort is represented by line I in the graph of Fig. 3 wherein, in accordance with (5), the logarithmic values of the signal before and after compression are represented by the horizontal and vertical coordinates of the graph, and wherein the slope of line I is substantially equal, throughout, to a fixed value for $n$.

According to the present invention, it has been found that a linear exponential compression of the signals does not give an entirely satisfactory form of reproduction of the original subject. The factor which makes linear exponential compression unsatisfactory can be found in the relation between the amplitude of any linearly compressed color signal and the spectral characteristics of the ink which is laid down as a function of the color signal. As stated, if the amplitude of the signal represents a given additive primary color, the ink responsively laid down is of the reciprocal subtractive color. As the amplitude of the signal decreases to represent a lower intensity of additive primary color on the original subject, the density of the ink increases to absorb more of the additive primary color from light impinging on the reproduction, or (as an alternative mode of explanation) to reflect from the reproduction more light of the subtractive color which is reciprocal to the additive primary color. As, however, the amplitude of the linearly compressed signal drops to lower and lower values, the accompanying progressive increase in ink density reaches a point beyond which a further increase does not serve to appreciably increase the absorption of light of additive primary color by the ink, or (as a different aspect of the same phenomenon) to increase, on the reproduction, the intensity of the reciprocal subtractive color. Thus, any colored ink has a limiting density value beyond which any further ink laid down represents a mere overdeposit which serves no useful purpose, and which has an unattractive appearance on the print.

This limitation in the spectral characteristics of the colored inks gives rise to the following problem. If the ink density is made a function of a color signal which has undergone a linear exponential compression whereof the exponent $n$ is of sufficiently low value that the maximum density of ink laid down does not exceed the mentioned limiting value, it has been found, in the median density range for the ink, that the spread in visual brightness of the reproduced colors will not be sufficient to realistically reproduce the corresponding spread in visual brightness of the parent colors on the original subject. On the other hand, if the ink density is made a function of a color signal which has undergone a linear exponential compression whereof the exponent, $n$, is of sufficiently high value that a realistic reproduction as to visual brightness is obtained in the median density range, it has been found that the signal will, on occasion, cause the ink density to exceed the mentioned limiting value therefor.

It is accordingly an object of this invention to provide methods and apparatus for compressing a signal, representing visual information on an original subject, in a manner such that the range of reproduced tonal intensities derived from the signal will, in terms of appearance to the human eye, represent most effectively, the full range of tonal intensities of the original subject.

It is another object of this invention to provide methods and apparatus of the above-noted character for compressing the signal in such manner that an overdeposit of ink is avoided when the reproduction is in the form of an ink print.

These and other objects are realized, according to an apparatus manifestation of the invention, by providing an electric compressor means and a signal modifying means in combination with a facsimile reproduction system wherein an electro-optical scanner develops an electric signal proportional to the varying intensity values of successively scanned areas of an original subject. The compressor means is adapted to compress the output signal from the scanner so that the output signal from the compressor means is proportional to the amplitude of the scanner signal raised to an exponent having a value of less than 1. The signal modifying means is of such nature, and is so connected with the scanner and with the compressor means, that the signal modifying means by its operation renders the value of the mentioned exponent a function of the amplitude of the scanner signal.

The mentioned objects and other objects are also realized according to the methods of the present invention by developing an electric signal proportional in amplitude to the varying intensity values of successive elemental areas on an original visual subject, additively combining this signal with a signal of constant amplitude, and compressing the resultant signal by a mode of compression which follows an exponential function whereof the exponent is invariable during changes in the amplitude of the first-named signal.

Figure 2:
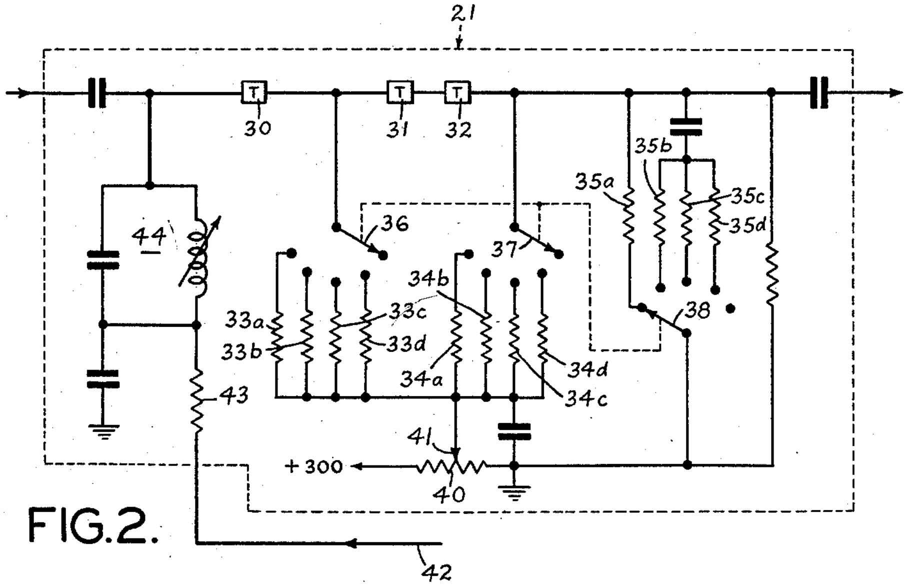
Fig. 2 is a detailed schematic diagram of one of the blocks of Fig. 1.

For a better understanding of the invention, reference is made to the showing in Fig. 1 of one apparatus embodiment suitable for carrying out the method of the invention. This embodiment is comprised, in the blue color channel, of the signal modifying circuit 20 and the exponential compressor circuit 21. Considering first the exponential compressor, this circuit (as shown in Fig. 2) comprises a network made up of the non-linear resistance devices 30, 31 and 32, and of one selected linear resistor from each of three groups 33*a*–33*d*, 34*a*–34*d*, 35*a*–35*d* of linear resistors, the selection among the various resistors in each group being accomplished by the gang-operated switches 36, 37, 38. The devices 30, 31, 32 may be comprised, for example, of silicon carbide resistors usually known in the electrical industry as "Thyrite" resistors.

By good engineering practice, the resistance values of the individual linear resistors may be proportioned relative to each other and relative to the resistance characteristics of the non-linear devices 30, 31, 32 to provide for different degrees of compression of a signal of a given amplitude which is supplied as an input to the compressor circuit. As an aid to bringing the actual signal compression which takes place into conformity with a preselected mode of compression for the signal, the circuit includes a variable tap resistor 40 which is connected to inject an adjustable D.C. biasing voltage from its tap 41 into the network of non-linear resistance devices and linear resistors. Also, the compressor circuit 21 includes a feature wherein a rectified form of the blue color signal is fed from a subsequent point in the blue color channel, through a lead 42, a resistor 43, a parallel tuned circuit 44 (resonant at the frequency of the compressor input signal), to the input of the compressor network. It has been found that such feedback signal increases the effectiveness of the network in compressing the high frequency input signal thereto.

The compressor circuit 21 compresses the high frequency input signal by an exponential compression whereof the exponent remains invariable during changes in the modulation amplitude of the input signal. If the circuits preceding the compressor 21 were such that the compressor input signal was proportional to the scanner signal in amplitude, the relationship between the compressed signal and the scanner signal would be one of linear exponential compression. In other words, as shown by line I of the graph in Fig. 3, the logarithm of the modulation amplitude of the compressed signal would be linearly related to the logarithm of the modulation amplitude of the scanner signal, with the exponent of compression $n$ being the fixed value slope of this linear function. As discussed heretofore, this linear relationship is incompatible with the objective of obtaining the best results in reproduction.

Figure 3:
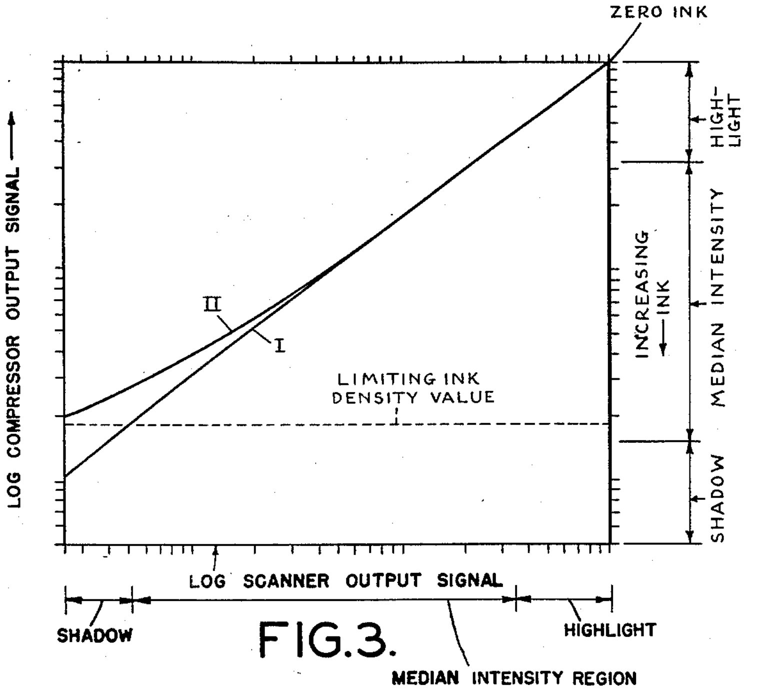
Fig. 3 is a graph of aid in explaining the nature of the invention.

It has been found, according to the invention, that for best reproducing results, the relation between the scanner signal and the compressed signal should be the relation represented by line II of the graph of Fig. 3. As indicated by line II, an attribute of this optimum relation between scanner signal and compressed signal is that the exponent of compression, $n$, is a function of the amplitude of the scanner signal, rather than being invariable during changes in such amplitude. More specifically, as shown by the variable value slope (representing $n$) for line II, the value of $n$ should decrease with decreasing amplitude of the scanner signal in order to obtain the optimum scanner signal-compressed signal relationship.

The described variation in value of the exponent of compression in the scanner signal-compressed signal relation, is provided for, in effect, by the action of the signal modifying circuit 20. In this circuit, the scanner signal is impressed on the control grid 50 of a pentode 51 having a cathode 52 connected to ground through a cathode resistor 53, and having an anode 54 connected to a positive voltage supply (not shown) through an anode load resistor 55. These connections render the pentode 51 a cathode grounded amplifier. As is seen in Fig. 1, certain ancillary connections are associated with the amplifier. For example, a feedback path is provided from the midpoint of cathode resistor 53 to grid 50 in order to increase the input impedance of the pentode. Also, the anode current for the tube is filtered by a condenser 56 connected between ground and the junction 57 of anode load resistor 55 with a resistor 58 located between resistor 55 and the positive voltage supply. The screen voltage is obtained in the usual manner by a resistor 59 connected between the screen 60 and junction 57, and by a filter condenser 61 connected between the screen 60 and the cathode 53.

As is evident, the scanner signal which is supplied to grid 50 of pentode 52 will appear in amplified form at the anode 54 of this pentode. It will be recalled that this amplified scanner signal is in the form of modulation on a 150 kc. carrier. Connected by one end to the anode 54 is a current limiting resistor 70 which is connected at the other end to a lead 71 which supplies a constant voltage 150 kc. signal from oscillator 17 to all three of the signal modifying circuits 20, 20', 20''. Since the 150 kc. oscillations of the scanner signal are synchronized in the first instance with those of oscillator 17, the signal on lead 71 will be both co-equal in frequency with and synchronized in phase with the oscillations of the carrier signal. By conventional phase control means (not shown), the phases of the two signals are so synchronized that the signal injected from lead 71 through resistor 70 onto anode 54 is substantially in phase with the scanner signal appearing at anode 54.

The current limiting resistor 70 and the anode load resistor 55 form a mixing network wherein a constant amount of the "injection" signal from lead 71 is additively combined at anode 54 with the varying amplitude scanner signal. Thus, the signal compressed by exponential compressor 21 is not the scanner signal alone, but is, instead, a resultant signal constituted of the scanner signal increased in amplitude by the constant amount contributed by the injection signal.

As is seen in graph line II (Fig. 3), the addition of the constant amplitude injection signal to the variable amplitude scanner signal has the effect, in the scanner signal-compressed signal relation, of rendering *n*, the exponent of compression thereof, a function of the scanner signal amplitude. For example, assume that the scanner signal may have an amplitude range of 1–500 units, and that the injection signal adds 25 units to the scanner signal. At the low end of the amplitude scale the amount contributed to the resultant signal by the injection signal will be considerably larger than the amount contributed by the scanner signal. Accordingly, a certain percentage change in the scanner signal amplitude results in much less of a percentage change in the resultant signal amplitude. This disproportion in percentage change has the result that the scanner signal will appear to be more compressed in its low amplitude region than at higher amplitudes where the amount contributed by the injection signal to the resulant signal is relatively small compared to the total amplitude of the resultant signal.

Translating the above-described scanner signal-compressed signal relationship into terms of the density of the ink responsively laid down, for low amplitude values of the scanner signal (corresponding to high density values for the ink) the density of the ink is somewhat more compressed than for high amplitude values of the signal (corresponding to low density values for the ink). It has been found that this additional compression of the ink density in the high density region permits a visually realistic reproduction of the original colors to be obtained throughout the full ink density range. At the same time, the additional compression in the high density range prevents an increase in ink density beyond the mentioned limiting value thereof.

It will be understood that, while the foregoing description of apparatus has been confined principally to the blue color channel, the green and red color channels of the described facsimile reproduction system have like apparatus and perform like operations in the course of compressing the green and red color signals.

The embodiment above described being exemplary only, it will be understood that the present invention comprehends embodiments differing in form or in detail from the presently described embodiment. For example, while the invention has been described in connection with a color reproducing system, the invention is also applicable to a black and white reproducing system. Accordingly, the invention is not to be considered as limited save as it consonant with the scope of the following claims.

I claim:

1. In a facsimile reproduction system wherein an electro-optical scanner develops an electric signal which varies in amplitude over a range of variation to represent the varying intensity values of successively scanned elemental areas of an original subject and of which one direction of amplitude variation represents an increase in said intensity values, one extreme of said range of amplitude variation representing shadow tones of intensity values below a predetermined lower intensity value, the combination therewith comprising, means for providing a signal of an amplitude which is constant and is smaller than the variation in amplitude of said first-named signal over said range and of like frequency characteristic as said first named signal, and means adapted by combining said constant amplitude signal and said first named signal to produce an output signal wherein, relative to said first named signal, the amplitude of said output signal is changed in said direction of amplitude variation and by an amount establishing for said output signal at said one extreme of said range of amplitude variation a minimum absolute amplitude at least as great as the amplitude of said first named signal which represents said lower intensity value.

2. In a facsimile reproduction system wherein an electro-optical scanner is adapted to develop a high frequency carrier signal which is modulated in amplitude over a range of amplitude variation to represent the varying intensity values of successively scanned elemental areas of an original subject and of which one direction of amplitude variation of the modulations represents an increase in said intensity values, one extreme of said range of amplitude variation representing shadow tones of intensity values below a predetermined lower intensity value, the combination therewith comprising, means for providing a constant amplitude signal which is of the same frequency as said carrier signal and is of smaller amplitude than the amplitude variation of said modulations over said range, and means for additively combining said constant amplitude signal and said modulated high frequency carrier signal to produce an output signal in the form of an amplitude modulated carrier wherein, relative to said first named carrier signal, the modulation amplitude of said output signal is changed in said direction of amplitude variation and by an amount establishing for said output signal at said one extreme of said range of amplitude variation a minimum modulation amplitude at least as great as the modulation amplitude of said first named carrier signal which represents said lower intensity value.

3. In a facsimile reproduction system wherein an electro-optical scanner is adapted when receiving a high frequency alternating signal to develop a high frequency carrier signal which is locked in frequency with said alternating signal and which is modulated in amplitude over a range of amplitude variation to represent the varying intensity values of successively scanned elemental areas of a visual subject and of which one direction of amplitude variation of the modulations represents an increase in said intensity values, one extreme of said range of amplitude variation representing shadow tones of intensity values below a predetermined lower intensity value, the combination therewith comprising, electric circuit means including oscillator means for supplying said alternating signal to said scanner and for developing an injection signal which is locked in frequency with said alternating signal to be synchronized in phase and coequal in frequency with said modulated carrier signal, said injection signal being of a constant amplitude and smaller in amplitude than the amplitude variation of said modulations over said range, and a mixing network for combining said injection signal with said modulated high frequency carrier signal to produce an output signal in the form of an amplitude modulated carrier wherein, relative to said first named carrier signal, the modulation amplitude of said output signal is changed in said direction of amplitude variation and by an amount establishing for said output signal at said one extreme of said range of amplitude variation a minimum modulation amplitude at least as great as the modulation amplitude of said first named carrier signal which represents said lower intensity value.

4. In a facsimile reproduction system wherein an electro-optical scanner is adapted to develop a high frequency carrier signal which is modulated in amplitude over a range of amplitude variation to represent the varying intensity values of successively scanned elemental areas of an original subject and of which one direction of amplitude variation of the modulations represents an increase in said intensity values, one extreme of said range of amplitude variation representing shadow tones of intensity values below a predetermined lower intensity value, the combination therewith comprising, means for providing a constant amplitude signal which is of the same frequency as said carrier signal and is of smaller amplitude than the amplitude variation of said modulations over said range, and means for combining said constant amplitude signal and said modulated high frequency carrier signal to produce an output signal in the form of an amplitude modulated carrier wherein, relative to said first named carrier signal, the modulation amplitude of said output signal is changed in said direction of amplitude variation and by an amount establishing for said output signal at said one extreme of said range of amplitude variation a minimum modulation amplitude at least as great as the modulation amplitude of said first named carrier signal which represents said lower intensity value.

References Cited in the file of this patent

UNITED STATES PATENTS

| | | |
|---|---|---|
| 2,250,571 | Buschbeck | July 29, 1941 |
| 2,581,124 | Moe | Jan. 1, 1952 |
| 2,691,696 | Yule | Oct. 12, 1954 |
| 2,730,567 | McConnell | Jan. 10, 1956 |